US012780305B2

(12) United States Patent
Kim

(10) Patent No.: US 12,780,305 B2
(45) Date of Patent: Nov. 3, 2026

(54) VEHICLE CONTROL DEVICE AND METHOD THROUGH ESTIMATING STEERING ANGLE OF FRONT WHEEL

(71) Applicant: HL MANDO CORPORATION, Pyeongtaek-si (KR)

(72) Inventor: JinSoo Kim, Pyeongtaek-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 19/050,594

(22) Filed: Feb. 11, 2025

(65) Prior Publication Data

US 2025/0382007 A1 Dec. 18, 2025

(30) Foreign Application Priority Data

Jun. 14, 2024 (KR) ........................ 10-2024-0077705

(51) Int. Cl.

*B62D 5/04* (2006.01)
*B62D 7/15* (2006.01)
*B62D 15/02* (2006.01)

(52) U.S. Cl.

CPC ........... *B62D 7/159* (2013.01); *B62D 5/0493* (2013.01)

(58) Field of Classification Search

CPC ........... B60W 40/105; B60W 2510/20; B60W 2510/182; B60W 2710/207; B62D 5/0481;

(Continued)

(56) References Cited

U.S. PATENT DOCUMENTS 6,792,343 B2 * 9/2004 Yasui .................. B60T 8/17636 180/197
6,925,371 B2 * 8/2005 Yasui ..................... B62D 6/003 701/72

(Continued)

FOREIGN PATENT DOCUMENTS

JP 6164386 B2 7/2017
KR 10-2013-0055840 A 5/2013

(Continued)

OTHER PUBLICATIONS

Notice of Allowance issued in KR 10-2024-0077705; mailed by the Korean Ministry of Intellectual Property on Jul. 10, 2026.

*Primary Examiner* — Erick R Solis
(74) *Attorney, Agent, or Firm* — Studebaker Brackett PLLC

(57) ABSTRACT

The present embodiments relate to a vehicle control device and method capable of controlling a vehicle by estimating a front wheel steering angle. A vehicle control device may receive rear wheel steering angle information, partial braking pressure information, and driving speed information of a vehicle, may extract a coefficient of a front wheel steering angle variable, by using at least one of the rear wheel steering angle information, the partial braking pressure information, and the driving speed information, may estimate a front wheel steering angle of the vehicle by inputting the coefficient of the front wheel steering angle variable, the rear wheel steering angle information, and the partial braking pressure information into a steering angle estimation function, and may generate a control signal for controlling an operation of the vehicle, by using an estimated front wheel steering angle.

20 Claims, 10 Drawing Sheets

(58) Field of Classification Search
CPC .... B62D 5/0484; B62D 5/0493; B62D 7/159; B62D 14/021; B62D 14/024
USPC ...................................................... 701/41, 43
See application file for complete search history.

(56) References Cited

U.S. PATENT DOCUMENTS

| | | | | |
|---|---|---|---|---|
| 2005/0071061 | A1* | 3/2005 | Kato | B62D 6/006 180/443 |
| 2017/0088173 | A1* | 3/2017 | Kawabe | B62D 1/00 |

FOREIGN PATENT DOCUMENTS

| | | | |
|---|---|---|---|
| KR | 10-1576395 | B1 | 12/2015 |
| KR | 10-2018-0049097 | A | 5/2018 |
| KR | 10-2018-0068681 | A | 6/2018 |
| KR | 10-2019-0016643 | A | 2/2019 |
| KR | 10-2566961 | B1 | 8/2023 |
| KR | 10-2764136 | B1 | 2/2025 |

* cited by examiner

FIG.5

| K | $J_\delta$ | $b_\delta$ | $k_\delta$ |
|---|---|---|---|
| 0 | 0.01 | 0.78 | 1.16 |
| 0.1 | −10.67 | −127 | −266 |
| 0.2 | −151 | −511 | −744 |
| ... | ... | ... | ... |
| 0.8 | −1234.45 | 146798.4 | −300154.1 |
| 0.9 | 930.86227 | 78954 | 45236 |
| 1 | 5146.95 | 336547.6 | 455578 |

VEHICLE CONTROL DEVICE AND METHOD THROUGH ESTIMATING STEERING ANGLE OF FRONT WHEEL

CROSS REFERENCE TO RELATED APPLICATION

This application claims priority from Korean Patent Application No. 10-2024-0077705, filed on Jun. 14, 2024, which is hereby incorporated by reference for all purposes as if fully set forth herein.

TECHNICAL FIELD

An embodiment of the present disclosure relates to a vehicle control device and a vehicle control method by estimating a steering angle of a front wheel.

BACKGROUND

There are a front-wheel driving method and a rear-wheel driving method in the driving system of automobiles for transferring the power generated from an engine of the automobile to the wheels to move a vehicle body. Front-wheel driving may be a method in which the power of the automobile engine is transmitted to the front wheels, and the vehicle moves by the power of the front wheels, and the rear wheels follow. The rear-wheel driving may be a method in which the power of the automobile engine is transmitted to the rear wheels, and the vehicle moves by the power of the rear wheels, and the front wheels control the traveling direction. The steering of the front wheels is important for vehicle movement in both the front-wheel driving or the rear-wheel driving.

In addition, recently, there has been developed a vehicle equipped with a Steer-by-Wire (SbW) system, which is an electric signal steering system capable of transmitting the driver's steering intention through an electrical signal without a mechanical connection between a steering wheel and the vehicle wheels.

However, in the event of a failure in the SbW system, the vehicle may be in a free-rolling state, requiring rear-wheel steering or partial braking to control the vehicle. However, when the rear-wheel steering or the partial braking is performed, a physical front-wheel steering angle may be generated due to the influence of the mechanical design (e.g., scrub radius). In this case, it is difficult to identify the extent of the generated front-wheel steering angle, and there is a limit to measuring the front-wheel steering angle in real time, which causes difficulties in driving the vehicle.

SUMMARY

Embodiments of the present disclosure are to provide a vehicle control device and method and capable of controlling a vehicle by estimating a steering angle of the front wheels.

In accordance with an aspect of the present disclosure, there may be provided a vehicle control device including a receiver configured to receive rear wheel steering angle information, partial braking pressure information, and driving speed information of a vehicle, a coefficient extractor configured to extract a coefficient of a front wheel steering angle variable, by using at least one of the rear wheel steering angle information, the partial braking pressure information, and the driving speed information, a front wheel steering angle estimator configured to estimate a front wheel steering angle of the vehicle by inputting the coefficient of the front wheel steering angle variable, the rear wheel steering angle information, and the partial braking pressure information into a steering angle estimation function, and a control signal generator configured to generate a control signal for controlling an operation of the vehicle, by using an estimated front wheel steering angle.

In accordance with another aspect of the present disclosure, there may be provided a vehicle control method including a step of receiving rear wheel steering angle information, partial braking pressure information, and driving speed information of a vehicle, a step of extracting a coefficient of a front wheel steering angle variable, by using at least one of the rear wheel steering angle information, the partial braking pressure information, and the driving speed information, a step of estimating a front wheel steering angle of the vehicle by inputting the coefficient of the front wheel steering angle variable, the rear wheel steering angle information, and the partial braking pressure information into a steering angle estimation function, and a step of generating a control signal for controlling an operation of the vehicle, by using an estimated front wheel steering angle.

In accordance with another aspect of the present disclosure, there may be provided a vehicle control device including at least one memory configured to store computer program instructions, and at least one processor configured to execute the computer program instructions stored in the at least one memory. The at least one processor may be further configured to receive rear wheel steering angle information, partial braking pressure information, and driving speed information of a vehicle, may extract coefficient of a front wheel steering angle variable, by using at least one of the rear wheel steering angle information, the partial braking pressure information, and the driving speed information, may estimate a front wheel steering angle of the vehicle by inputting the coefficient of the front wheel steering angle variable, the rear wheel steering angle information, and the partial braking pressure information into a steering angle estimation function, and may generate a control signal for controlling an operation of the vehicle, by using an estimated front wheel steering angle.

According to an embodiment of the present disclosure, it is possible to provide a vehicle control device and method and capable of controlling a vehicle by estimating a steering angle of the front wheels.

BRIEF DESCRIPTION OF THE DRAWINGS

FIG. 5 is a diagram for explaining an example of a table storing extracted front wheel steering angle coefficients according to one embodiment.

DETAILED DESCRIPTION

Figure 1:
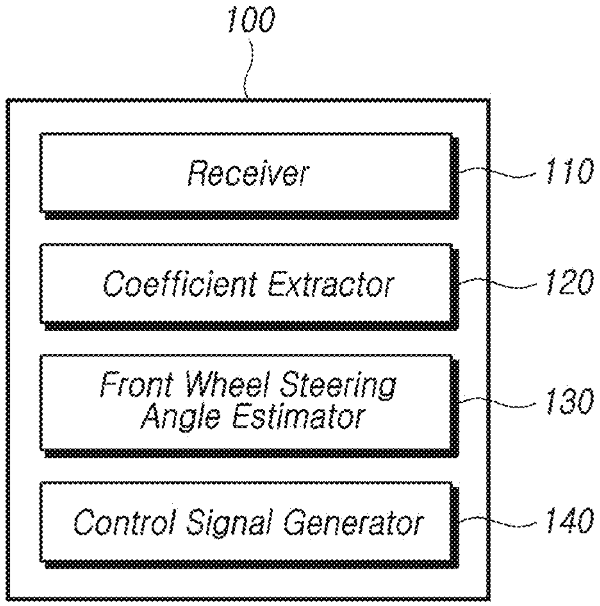
FIG. 1 is a diagram for explaining the configuration of a vehicle control device for controlling a vehicle by estimating a front wheel steering angle according to an embodiment.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, it will be described embodiments with reference to the drawings.

FIG. 1 is a diagram for explaining the configuration of a vehicle control device for controlling a vehicle by estimating a front wheel steering angle according to an embodiment.

Referring to FIG. 1, a vehicle control device by estimating a front wheel steering angle may include a receiver 110 for receiving rear wheel steering angle information, partial braking pressure information, and driving speed information of a vehicle.

The vehicle control device 100 of the present disclosure is related to estimate a behavior of front wheel steering, by using a preset front wheel steering function in order to solve the problem of limitations in measuring a front wheel steering angle naturally formed in real time when applying partial braking or rear wheel steering. In this specification, the front wheel steering function may be used with the same meaning as a steering angle estimation function.

Therefore, the present disclosure may propose a front wheel steering function as in Equation 1 as a method for using an estimated value using a function rather than a measured value of the front wheel steering angle.

$$J_\delta \ddot{\delta}_f + b_\delta \dot{\delta}_f + k_\delta \delta_f = K\left\{\frac{W}{2}\left(F_b^L - F_b^R\right)\right\} + (1-K)\delta_r \qquad \text{[Equation 1]}$$

Specifically, $\delta_f$ may be a front wheel steering angle (unit: rad), $\dot{\delta}_f$ may be the front wheel steering angle speed (unit: rads), $\ddot{\delta}_f$ may be the front wheel steering angle acceleration (unit: rad/s2), $k_\delta$ may be a front wheel steering angle coefficient, $b_\delta$ may be a front wheel steering angle speed coefficient, $J_\delta$ may be a front wheel steering angle acceleration coefficient, K may be a rear wheel steering and partial braking input ratio (K is a real number greater than or equal to 0 and less than or equal to 1), W is a distance between the two tires (unit: m), $$F_b^L$$

may be a longitudinal force on the left tire generated due to the partial braking pressure (unit: N), $$F_b^R$$

may be a longitudinal force on the right tire generated due to the partial braking pressure (unit: N), and $\delta_r$ or may be the applied rear wheel steering angle (unit: rad).

In the front wheel steering function, if the rear wheel steering and partial braking input ratio K is 0, only rear wheel steering may be applied, and when K is 1, only partial braking may be applied. Therefore, in the vehicle control device of the present disclosure, when estimating the front wheel steering angle, it is not necessary to apply both the rear wheel steering and the partial braking. In addition, the front wheel steering angle may be estimated even if at least one of the rear wheel steering and the partial braking is applied.

The receiver 110 of the vehicle control device 100 of the present disclosure may receive at least one of the rear wheel steering angle information, the partial braking pressure information, and the driving speed information necessary for front wheel steering angle estimation. The above-described information may be acquired by a method of receiving detection information of a sensor mounted on the vehicle.

The vehicle control device 100 through front wheel steering angle estimation may include a coefficient extractor 120 which extracts a coefficient of a preset front wheel steering angle variable, by using at least one of the rear wheel steering angle information, the partial braking pressure information, and the driving speed information. In the specification, a coefficient of a front wheel steering angle variable may be also referred to as a front wheel steering angle coefficient.

The vehicle control device 100 of the present disclosure may extract a coefficient of a preset front wheel steering angle variable based on at least one of the rear wheel steering angle information, the partial braking pressure information, and the driving speed information, which are information received by the receiver 110.

For example, the coefficient of the preset front wheel steering angle variable may be stored in at least one table by being correspondent to at least one of a rear wheel steering and partial braking input ratio and the driving speed information of the vehicle. The vehicle control device 100 of the present disclosure may search or retrieve the table by inputting at least one of the current driving speed of the vehicle and the preset rear wheel steering and partial braking input ratio as a search condition, and may extract the coefficient of the front wheel steering angle variable by obtaining the search result.

As another example, the coefficient of the front wheel steering angle variable stored in the table may be preset based on the least square linear regression method which minimizes the square of a difference between a first matrix including a plurality of pieces of front wheel steering angle information and the coefficients of the front wheel steering angle variable and a second matrix including a plurality of pieces of rear wheel steering angle information and a plurality of pieces of partial braking pressure variable information.

As another example, the coefficient of the front wheel steering angle variable stored in the table may be preset based on data output by performing learning through an artificial intelligence model which uses a plurality of front wheel steering angle information, a plurality of rear wheel steering angle information, and a plurality of partial braking pressure variable information as learning data, and inputting the driving speed of the vehicle into the artificial intelligence model for which learning has been completed.

In the artificial intelligence model, artificial intelligence may a concept including machine learning and deep learning. Machine learning may be a method of analyzing a large amount of data according to specific rules and logic and then providing a prediction based on the data, and deep learning may be a type of machine learning in which a machine analyzes/learns data on its own and extracts features to perform learning/prediction. Therefore, the artificial intelligence model used to set the coefficient of the front wheel steering angle variable may be a model capable of outputting the coefficient of the front wheel steering angle variable by selecting at least one of machine learning and deep learning.

The vehicle control device 100 through front wheel steering angle estimation may include a front wheel steering angle estimator 130 which inputs input data including the coefficient of the front wheel steering angle variable, the rear wheel steering angle (information), and the partial braking pressure (information) into a preset steering angle estimation function to estimate the front wheel steering angle of the vehicle.

The front wheel steering angle estimator 130 of the present disclosure may estimate the front wheel steering angle of the vehicle by inputting the coefficient of front wheel steering angle and data detected in relation to the vehicle into a preset front wheel steering function when the coefficient of the front wheel steering angle is extracted.

The vehicle control device 100 of the present disclosure may calculate the front wheel steering angle, front wheel steering angle speed, and front wheel steering angle acceleration by inputting values to each variable included in the front wheel steering function, and may finally estimate the front wheel steering angle.

The vehicle control device 100 through front wheel steering angle estimation may include a control signal generator 140 which generates a control signal for controlling the operation of the vehicle, by using the estimated front wheel steering angle.

The control signal generator 140 of the vehicle control device 100 of the present disclosure may generate a control signal so that the vehicle can be controlled based on the front wheel steering angle when the current front wheel steering angle of the vehicle is estimated.

The present disclosure may propose a method of estimating a front wheel steering angle naturally generated through rear wheel steering or partial braking when the front wheels of a vehicle are in a free-rolling state based on a preset front wheel steering function, and controlling the vehicle, by using the estimation result.

Through this, a controller such as a steer-by-brake (SbB or) a steer-by-brake with rear wheel steer (SbR+) may accurately estimate not only the behavior of the front wheels but also the behavior of the vehicle, and has the advantage of improving the control performance of the vehicle.

Figure 2:
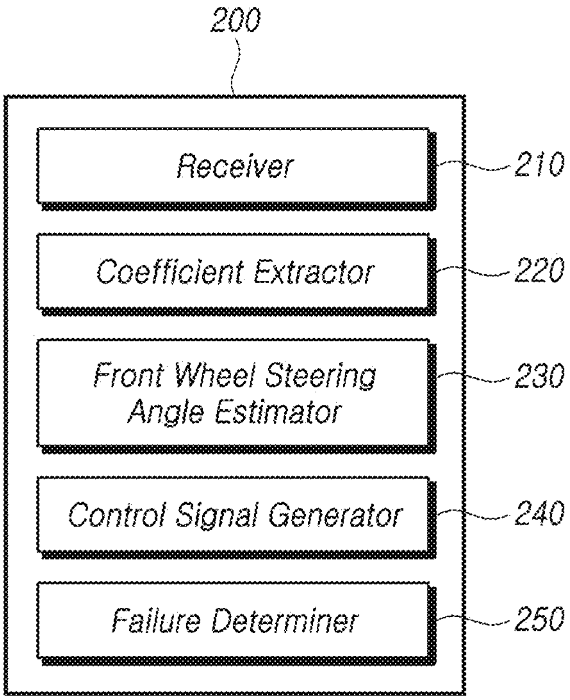
FIG. 2 is a diagram for explaining another example of a vehicle control device for controlling a vehicle by estimating a front wheel steering angle according to an embodiment.

FIG. 2 is a diagram for explaining another example of a vehicle control device for controlling a vehicle by estimating a front wheel steering angle according to an embodiment.

Referring to FIG. 2, a vehicle control device 200 of the present disclosure may further include additional components in addition to a receiver 210, a coefficient extractor 220, a front wheel steering angle estimator 230, and a control signal generator 240 as described above in FIG. 1.

As an example, the vehicle control device 200 through front wheel steering angle estimation may include a failure determiner 250 which determines whether a Steer-by-Wire (SbW) system of the vehicle is in a failure state.

The control signal generator 240 of the present disclosure may generate a control signal for controlling the operation of the vehicle, by using the front wheel steering angle estimated through the front wheel steering angle estimator 230 in the case that the failure determiner 250 determines that the SbW system of the vehicle is in a failure state.

In addition, the failure determiner 250 of the present disclosure may be further configured to determine the failure state of the SbW system of the vehicle, based on at least one output signal of the SbW system of the vehicle.

The SbW system may be an electric signal-type steering system capable of controlling the driver's steering intention by transmitting the driver's steering intention to the vehicle wheel with an electric signal without a mechanical connection between the driver's steering wheel and the vehicle wheel. The SbW system may be composed of an actuator (e.g., Road Wheel Actuator, RWA) which transmits the driver's steering intention to the vehicle wheel and moves the wheel, and an actuator (e.g., Steering Feedback Actuator, SFA) which provides the driver with a reaction force of the steering wheel, and at least one sensor or motor mounted on the vehicle.

For example, in the case that a failure occurs in the motor mounted on the SFA, the failure determiner of the present disclosure may directly detect the output signal output from the motor or receive information on the output signal from a detection device mounted on the vehicle to determine whether the motor is operating normally. For example, if the detected output signal is less than 70% of the signal output in a normal state, the failure determiner may determine that the SbW system is in a failure state.

In another example, if a failure occurs in a sensor mounted on an RWA or SFA, the failure determiner of the present disclosure may directly detect an output signal output from the sensor or receive information about the output signal from a detection device mounted on the vehicle to determine whether the motor is operating normally. For example, if the detected output signal is less than 70% of the signal output in a normal state, the failure determiner may determine that the SbW system is in a failure state.

The failure determiner of the present disclosure may set a threshold for determining whether a signal output from a device included in the SbW system is normal, and determine that the SbW system is in a failure state if a level or a magnitude of the output signal is less than the threshold. In addition, the failure determiner may determine that the SbW system is in a normal state if a level or a magnitude of the output signal is greater than the threshold.

As described above, the control signal generator 240 of the present disclosure may generate a control signal for controlling the operation of the vehicle, by using the front wheel steering angle estimated by the front wheel steering angle estimator 230 if the failure determiner 250 determines that the SbW system of the vehicle is in a failure state.

Figure 3:
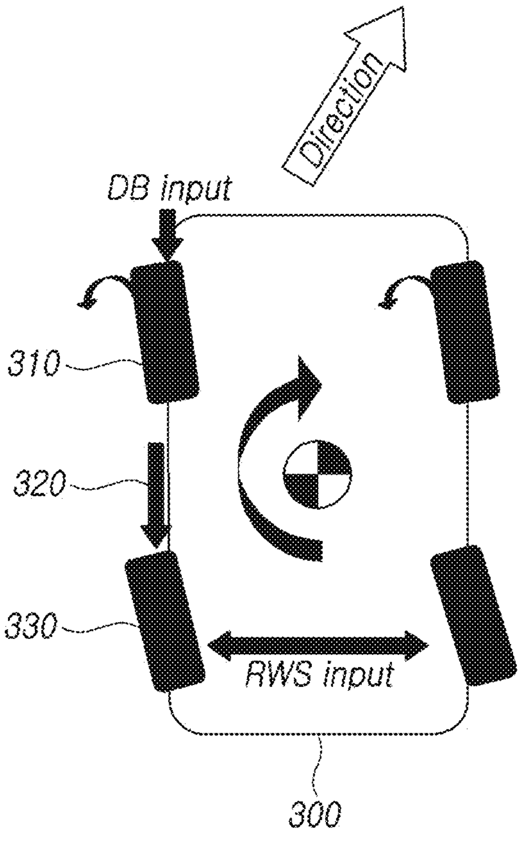
FIG. 3 is a diagram for explaining a failure situation of a SbW system.

In FIG. 3 and below, it will be specifically described a process in which the vehicle control device of the present disclosure estimates the front wheel steering angle based on the front wheel steering function.

FIG. 3 is a diagram for explaining a failure situation of a SbW system.

Referring to FIG. 3, in a vehicle 300 equipped with the SbW, the SbW system may be an electric signal-type steering system which is controlled by transmitting the driver's steering intention as an electric signal without a mechanical connection between the driver's steering wheel and the vehicle wheels as described above.

However, if a failure such as a communication failure occurs in the SbW system, a problem may occur in which the driver cannot control the steering as desired, or there may be required to utilize a fail-over system through partial braking and rear wheel steering control.

As described above, if a failure occurs in the SbW system, the front wheel 310 may be in a free-rolling state, and partial braking may be applied thereto or steering may be applied to the rear wheel 330. In this case, the front wheel steering angle may be naturally generated due to the influence of the mechanical design (e.g., scrub radius). However, there is a limitation in measuring the front wheel steering angle generated in the free-rolling state in real time.

Therefore, the present disclosure proposes a method of rapidly estimating the front wheel steering angle, by using a front wheel steering function rather than measuring the front wheel steering angle and pre-storing the values for specific variables in a table in order to secure steering performance through partial braking and rear wheel steering.

Figure 4:
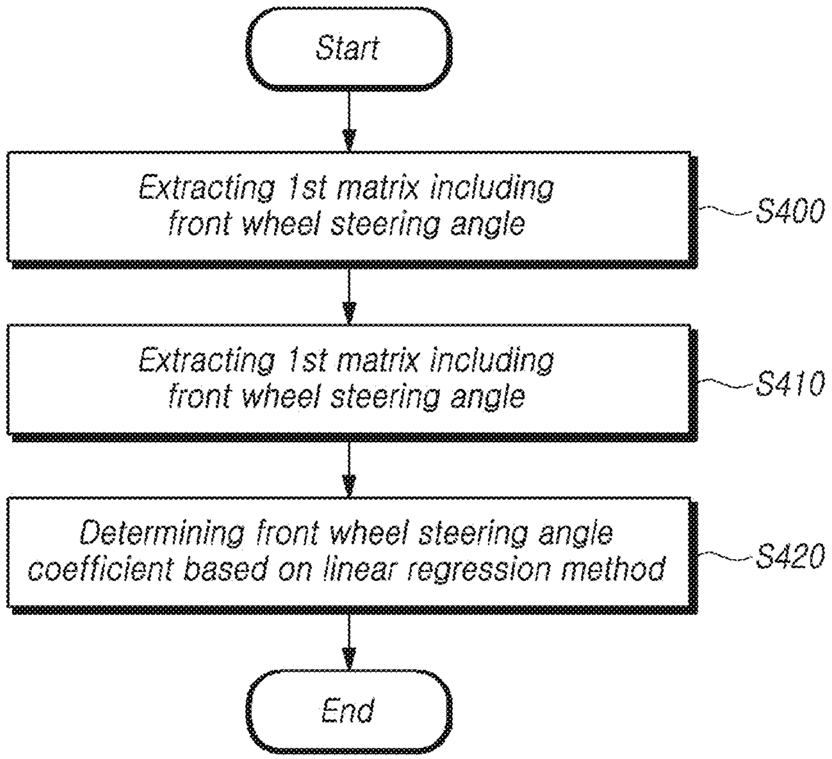
FIG. 4 is a flowchart for explaining a process of extracting a front wheel steering angle coefficient according to one embodiment.

FIG. 4 is a flowchart for explaining a process of extracting the front wheel steering angle coefficient according to one embodiment.

Referring to FIG. 4, the extraction of the front wheel steering angle coefficient may be performed by extracting a first wheel matrix including front steering angle information, extracting a second matrix including a plurality of rear wheel steering angle information and a plurality of partial braking pressure variable information, and calculating the front wheel steering angle coefficient, by using a linear regression method for the first matrix and the second matrix.

There may be used a lateral dynamics model of the vehicle, by using degrees of freedom (e.g., 3DOF lateral vehicle dynamics modeling) to calculate the front wheel steering angle coefficient.

The lateral dynamics model using degrees of freedom may be referred to as a method in which physical variables including steering angles are expressed in the form of state space equations.

The first matrix including front wheel steering angle information may be extracted (S400) through a lateral dynamic model of the vehicle, by using degrees of freedom, and a second matrix including a plurality of rear wheel steering angle information and a plurality of partial braking pressure variable information may be extracted (S410).

The front wheel steering angle information may include a front wheel steering angle, a front wheel steering angle speed, a front wheel steering angle acceleration, a front wheel steering angle coefficient, a front wheel steering angle speed coefficient, and a front wheel steering angle acceleration coefficient.

For example, the first matrix may be also be expressed as a product of one matrix including a front wheel steering angle, a front wheel steering angle speed, and a front wheel steering angle acceleration, and one matrix including a front wheel steering angle coefficient, a front wheel steering angle speed coefficient, and a front wheel steering angle acceleration coefficient.

For example, the first matrix may be an N*1 matrix (N is a natural number greater than or equal to 1) including a front wheel steering angle, a front wheel steering angle speed, a front wheel steering angle acceleration, a front wheel steering angle coefficient, a front wheel steering angle speed coefficient, and a front wheel steering angle acceleration coefficient. In addition, the second matrix may be an N*1 matrix including a plurality of rear wheel steering angle information and a plurality of partial braking pressure variable information.

If the first matrix and the second matrix are extracted, the difference between the first matrix and the second matrix may be calculated. In addition, there may be determined the minimum front wheel steering angle coefficient, front wheel steering angle speed coefficient, and front wheel steering angle acceleration coefficient (S420) by performing a square by adding the formulas of each row. This may be expressed as Equation 2.

$$\sum_{i=0}^{n}(b_i - W_i x)^2 \qquad \text{[Equation 2]}$$

Here, n may be the number of columns of the first matrix and the second matrix, b may be the second matrix, W may be a matrix including the front wheel steering angle, the front wheel steering angle speed, and the front wheel steering angle acceleration, and x may be a matrix including the front wheel steering angle coefficient, the front wheel steering angle speed coefficient, and the front wheel steering angle acceleration coefficient.

The method used to determine the coefficients in the present disclosure may be called the Least Square Regression method.

FIG. 5 is a diagram for explaining an example of a table storing extracted front wheel steering angle coefficients according to one embodiment.

Referring to FIG. 5, the vehicle control device of the present disclosure may store the extraction results in at least one table if the front wheel steering angle coefficient corresponding to various variables is extracted.

The various variables may include at least one of a rear wheel steering and partial braking input ratio value K (K is a real number between 0 and 1, or 0 or 1) included in the front wheel steering function and the driving speed of the vehicle. As described above, the K value is for arbitrarily adjusting the ratio of the rear wheel steering angle and the partial braking pressure in the front wheel steering function. The K value may be a real number greater than or equal to 0 and less than or equal to 1, and may be set in various ways as needed.

As an example, the table of FIG. 5 may be a numerically stored result for the front wheel steering angle coefficient, the front wheel steering angle speed coefficient, and the front wheel steering angle acceleration coefficient extracted according to the K value, which is the rear wheel steering and partial braking input ratio value. However, the table illustrated in FIG. 5 is only an example, and the table storing data such as the front wheel steering angle coefficient may be set in various ways according to the data extraction method and needs.

As another example, the vehicle control device of the present disclosure may classify the K value, which is the rear wheel steering and partial braking input ratio value, and the numerical values for the front wheel steering angle coefficient, the front wheel steering angle speed coefficient, and the front wheel steering angle acceleration coefficient based on the vehicle speed, and may store them in at least one table.

As another example, the vehicle control device of the present disclosure may store the front wheel steering angle coefficient, the front wheel steering angle speed coefficient, and the front wheel steering angle acceleration coefficient corresponding to a driving speed of the vehicle in one table.

In addition, at least one of the front wheel steering angle coefficient, the front wheel steering angle speed coefficient, and the front wheel steering angle acceleration coefficient may be stored in the table.

As described above, the data and configuration stored in the table are not limited thereto, and may be set in various ways according to needs.

Figure 6:
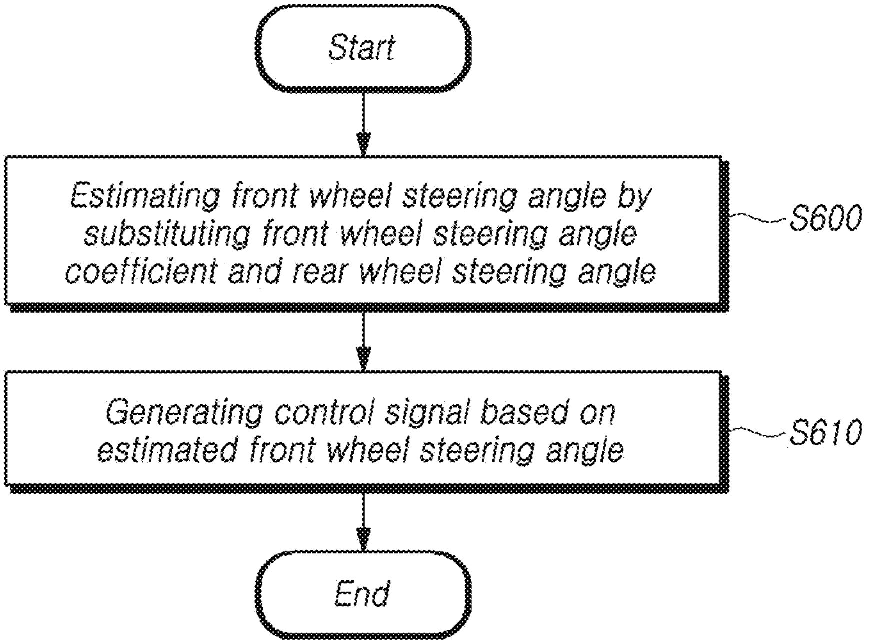
FIG. 6 is a flowchart for explaining a process of estimating a front wheel steering angle and controlling a vehicle through estimation results according to one embodiment.

FIG. 6 is a flowchart for explaining a process of estimating a front wheel steering angle and controlling a vehicle through estimation results according to one embodiment.

Referring to FIG. 6, the vehicle control device of the present disclosure may estimate the front wheel steering angle, by using the extracted front wheel steering angle coefficient, and may control the vehicle, by using the estimation result.

If the vehicle control device of the present disclosure extracts the front wheel steering angle coefficient, the vehicle control device may estimate the front wheel steering angle by substituting the front wheel steering angle coefficient into a preset front wheel steering function (S610).

Specifically, the front wheel steering function may include the terms for the front wheel steering angle, the front wheel steering angle coefficient, the rear wheel steering and partial braking input ratio K, the distance between the two tires, the rear steering angle, and the longitudinal tire force generated by partial braking pressure. The K is a preset value as needed, and the distance between the two tires, the rear wheel steering angle, and the longitudinal tire force generated by partial braking pressure may mean information detected through a sensor.

The vehicle control device of the present disclosure may estimate the front wheel steering angle by acquiring or detecting at least one piece of information among the distance between the two tires, the rear wheel steering angle, and the longitudinal tire force generated by the partial braking pressure, extracting the front wheel steering angle coefficient, and inputting the front wheel steering angle coefficient into the front wheel steering function.

If the front wheel steering angle is estimated, the vehicle control device of the present disclosure may generate a control signal so that the vehicle can be controlled based on the estimated front wheel steering angle. The control signal may include information about at least one of rear wheel steering angle and partial braking pressure to be adjusted.

Figure 7:
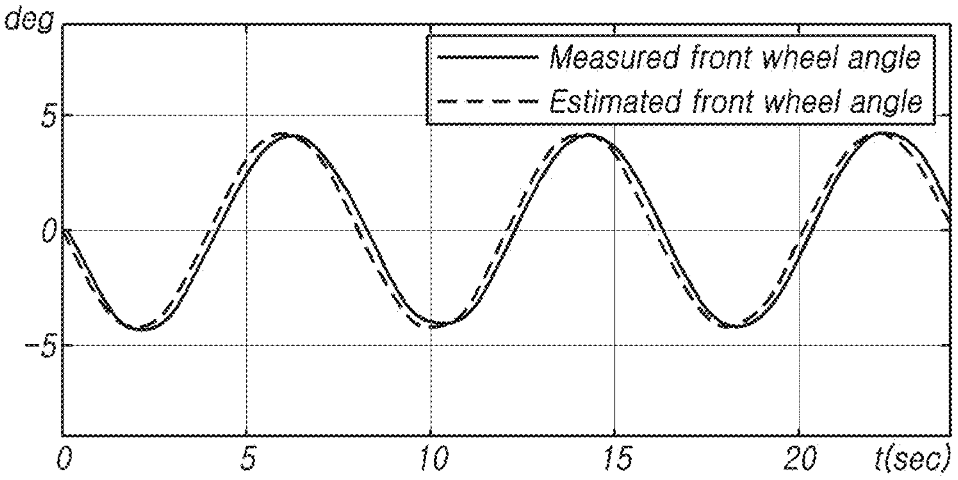
FIG. 7 is a diagram for explaining a comparison result between an estimated front wheel steering angle through a front wheel steering function and a measured front wheel steering angle according to one embodiment.

FIG. 7 is a diagram for explaining a comparison result between an estimated front wheel steering angle through a front wheel steering function and a measured front wheel steering angle according to one embodiment.

Referring to FIG. 7, the numbers expressed as solid lines in the graph may represent the results of measuring the change in the front wheel steering angle according to time, and the numbers expressed as dotted lines may represent the results of estimating the change in the front wheel steering angle according to time, by using the front wheel steering function as above.

The vehicle control device of the present disclosure may store information on the calculated front wheel steering angle coefficients in a table, may extract the coefficients through table lookup as needed, and may input the extracted coefficients into the front wheel steering function to estimate the front wheel steering angle.

According to FIG. 7, there may be illustrated that the measured value of the front wheel steering angle and the estimated value of the front wheel steering angle are almost identical or almost correspondent with each other.

Therefore, embodiments of the present disclosure may provide the effect of overcoming the limitation of measuring the front wheel steering angle in real time, by using the estimated value using the front wheel steering function.

Figure 8:
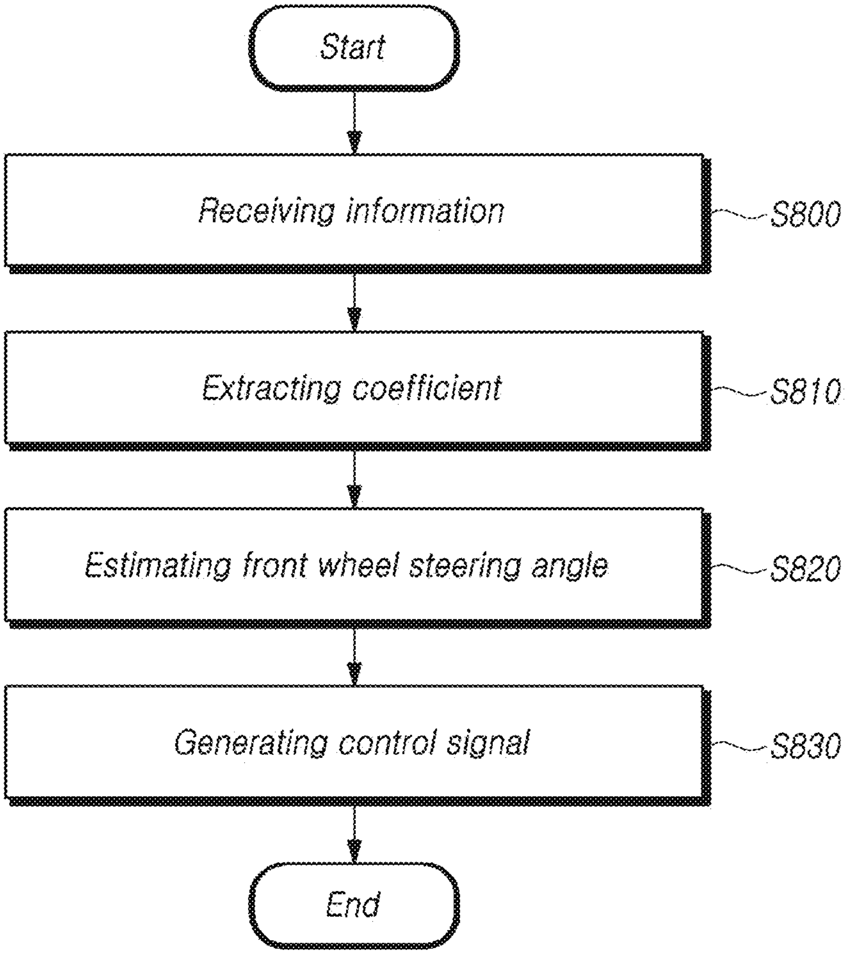
FIG. 8 is a flowchart for explaining a process of controlling a vehicle through front wheel steering angle estimation according to one embodiment.

FIG. 8 is a flowchart for explaining a process of controlling a vehicle through front wheel steering angle estimation according to one embodiment.

Referring to FIG. 8, a vehicle control method through front wheel steering angle estimation may include a receiving step for receiving rear wheel steering angle information, partial braking pressure information, and driving speed information of the vehicle (S800).

The vehicle control device of the present disclosure may receive at least one of rear wheel steering angle information, partial braking information, and driving speed pressure information necessary for front wheel steering angle estimation. The above-described information may be obtained by a method for receiving detection information of a sensor mounted on the vehicle.

The vehicle control method through front wheel steering angle estimation may include a coefficient extraction step for extracting a coefficient of a preset front wheel steering angle variable, by using at least one of rear wheel steering angle information, partial braking pressure information, and driving speed information (S810).

The vehicle control device of the present disclosure may extract a coefficient of a preset front wheel steering angle variable based on at least one of rear wheel steering angle information, partial braking pressure information, and driving speed information.

For example, the coefficient of the preset front wheel steering angle variable may be stored in at least one table corresponding to at least one of a rear wheel steering and partial braking input ratio of the vehicle and the driving speed information. The vehicle control device of the present disclosure may search or retrieve the table by inputting at least one of the current driving speed of the vehicle and the preset rear wheel steering and partial braking input ratio as a search condition, and may extract the coefficient of the front wheel steering angle variable by obtaining the search result.

As another example, the coefficient of the front wheel steering angle variable stored in the table may be preset based on a least square linear regression method which minimizes the square of the difference between a first matrix including a plurality of front wheel information and the coefficients of the front wheel steering angle variable, and a second matrix including a plurality of rear wheel steering angle information and a plurality of partial braking pressure variable information.

As another example, the coefficient of the front wheel steering angle variable stored in the table may be preset based on data which is learned by performing learning through an artificial intelligence model, by using a plurality of front wheel steering angle information, a plurality of rear wheel steering angle information, and a plurality of partial braking pressure variable information as learning data, and by inputting the driving speed of the vehicle into the artificial intelligence model which has completed learning.

The vehicle control method through front wheel steering angle estimation may include a front wheel steering angle estimation step of estimating the front wheel steering angle of the vehicle by inputting input data including the coefficient of the front wheel steering angle variable, the rear wheel steering angle, and the partial braking pressure into a preset steering angle estimation function (S820).

If the front wheel steering angle coefficient is extracted, the vehicle control device of the present disclosure may estimate the front wheel steering angle of the vehicle by inputting the front wheel steering angle coefficient and data detected in relation to the vehicle into a preset front wheel steering function.

The vehicle control device of the present disclosure may calculate the front wheel steering angle, the front wheel steering angle speed, and the front wheel steering angle acceleration by inputting values to each variable included in the front wheel steering function, and may finally estimate the front wheel steering angle.

The vehicle control method through front wheel steering angle estimation may include a control signal generation step for generating a control signal for controlling the operation of the vehicle, by using the estimated front wheel steering angle (S830).

The vehicle control device of the present disclosure may generate a control signal so that the vehicle can be controlled based on the front wheel steering angle when the front wheel steering angle of the current vehicle is estimated.

Figure 9:
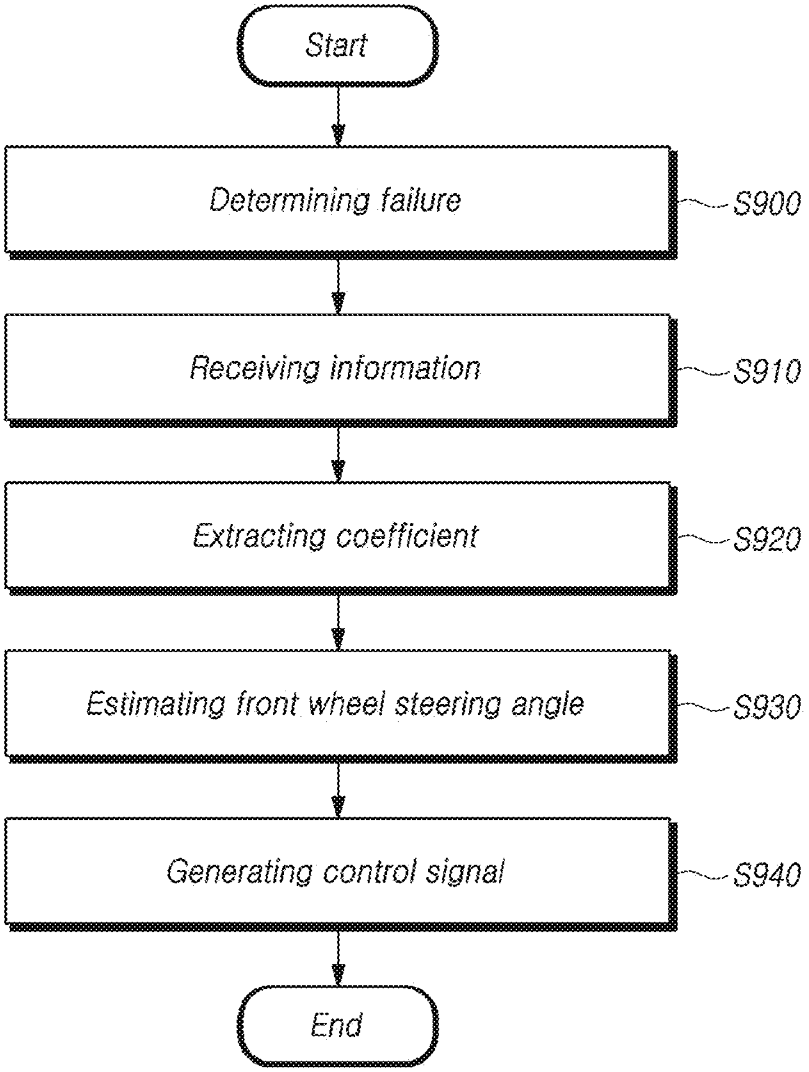
FIG. 9 is a flowchart for explaining another example of a process of controlling a vehicle through front wheel steering angle estimation according to one embodiment.

FIG. 9 is a flowchart for explaining another example of a process of controlling a vehicle through front wheel steering angle estimation according to one embodiment.

Referring to FIG. 9, the vehicle control method of the present disclosure may further include a step (S900) of determining a failure situation of a SbW system in addition to each step described above in FIG. 8.

The vehicle control device of the present disclosure may generate a control signal for controlling the operation of the vehicle, by using the estimated front wheel steering angle, assuming that the SbW system of the vehicle is determined to be in a failure state.

In addition, the vehicle control device of the present disclosure may be further configured to determine the failure state of the SbW system of the vehicle, based on at least one output signal of the SbW system of the vehicle.

For example, if a failure occurs in a motor mounted on an SFA, the vehicle control device of the present disclosure may directly detect an output signal output from the motor or receive information about the output signal from a detection device mounted on the vehicle to determine whether the operation of the motor is normal. For example, if the detected output signal is less than 70% of the signal output in the normal case, the vehicle control device of the present disclosure may determine that the SbW system is in a failure condition.

As another example, if a failure occurs in a sensor mounted on an RWA or an SFA, the vehicle control device of the present disclosure may directly detect an output signal output from the sensor or receive information about the output signal from a detection device mounted on the vehicle to determine whether the motor is operating normally. For example, if the detected output signal is less than 70% of the signal output in the normal case, the vehicle control device of the present disclosure may determine that the SbW system is faulty or is in a failure condition.

The vehicle control device of the present disclosure may set a threshold value for determining whether a signal output from a device included in the SbW system is normal, and determine that the SbW system is in a failure condition if a level or a magnitude of the output signal is less than the threshold value, and determine that the SbW system is in a normal condition if a level or a magnitude of the output signal is greater than the threshold value.

As described above, the vehicle control device of the present disclosure may generate a control signal for controlling the operation of the vehicle, by using the estimated front wheel steering angle in the case that the SbW system of the vehicle is determined to be in a failure state.

Through the operation of the above-described steps, the front wheel steering angle of the vehicle may be accurately estimated and the control performance of the vehicle may be improved. Accordingly, the control of the vehicle may be performed without error. Hereinafter, it will be described a vehicle control device implemented as a computing system capable of performing some or all of the embodiments described with reference to FIGS. 1 to 9 with reference to FIG. 10. A part of the above description may be omitted to avoid redundant description, and in this case, the omitted content may be substantially equally applied to the description below, unless it is contrary to the technical idea of the embodiment of the present disclosure.

Figure 10:
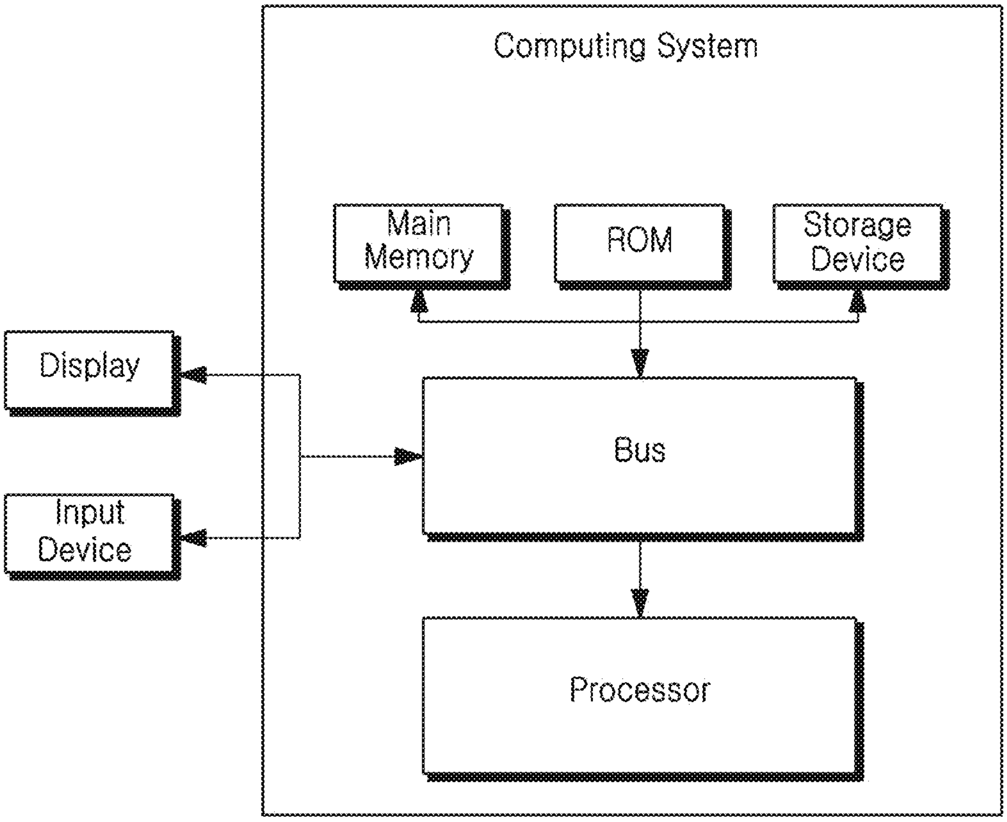
FIG. 10 is a block diagram of an exemplary computing system.

FIG. 10 is a block diagram of an exemplary computing system.

A vehicle control device according to one embodiment of the present disclosure may include at least one memory configured to store computer program instructions, and at least one processor configured to excute the computer program instructions stored in the at least one memory. In this case, the at least one processor may receive rear wheel steering angle information, partial braking pressure information, and driving speed information of a vehicle, may extract a coefficient of a front wheel steering angle variable, by using at least one of the rear wheel steering angle information, the partial braking pressure information, and the driving speed information, may estimate a front wheel steering angle of the vehicle by inputting the coefficient of the front wheel steering angle variable, the rear wheel steering angle information, and the partial braking pressure information into a steering angle estimation function, and may generate a control signal for controlling an operation of the vehicle, by using an estimated front wheel steering angle.

In addition, the at least one processor may be further configured to determine whether a Steer-by-Wire (SbW) system of the vehicle is in a failure state, and may be further configured to generate the control signal for controlling the operation of the vehicle, by using the estimated front wheel steering angle, in response to a determination of the failure state of the SbW system of the vehicle.

The computer system or computing device can include or be used to implement the system or its components such as the data processing system. The computing system includes a bus or other communication component for communicating information and a processor or processing circuit coupled to the bus for processing information. The computing system can also include one or more processors or processing circuits coupled to the bus for processing information. The computing system also includes main memory, such as a random access memory (RAM) or other dynamic storage device, coupled to the bus for storing information, and instructions to be executed by the processor. The main memory can be or include the data repository. The main memory can also be used for storing position information, temporary variables, or other intermediate information during execution of instructions by the processor. The computing system may further include a read-only memory (ROM) or other static storage device coupled to the bus for storing static information and instructions for the processor. A storage device, such as a solid state device, magnetic disk or optical disk, can be coupled to the bus to persistently store information and instructions. The storage device can include or be part of the data repository.

The computing system may be coupled via the bus to a display, such as a liquid crystal display or active matrix display, for displaying information to a user. An input device, such as a keyboard including alphanumeric and other keys, may be coupled to the bus for communicating information and command selections to the processor. The input device can include a touch screen display. The input device can also include a cursor control, such as a mouse, a trackball, or cursor direction keys, for communicating direction information and command selections to the processor and for controlling cursor movement on the display. The display can be part of the data processing system, the client computing device or other component.

The processes, systems and methods described herein can be implemented by the computing system in response to the processor executing an arrangement of instructions contained in main memory. Such instructions can be read into main memory from another computer-readable medium, such as the storage device. Execution of the arrangement of instructions contained in main memory causes the computing system to perform the illustrative processes described herein. One or more processors in multiprocessing arrangement may also be employed to execute the instructions contained in main memory. Hard-wired circuitry can be used in place of or in combination with software instructions together with the systems and methods described herein. Systems and methods described herein are not limited to any specific combination of hardware circuitry and software.

Although an example computing system has been described, the subject matter including the operations described in this specification can be implemented in other types of digital electronic circuitry, or in computer software, firmware, or hardware, including the structures disclosed in this specification and their structural equivalents, or in combinations of one or more of them.

The terms "data processing system," "computing device," "component," or "data processing apparatus" encompass various apparatuses, devices, and machines for processing data, including by way of example a programmable processor, a computer, a system on a chip, or multiple ones, or combinations of the foregoing. The apparatus can include special-purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The components of system can include or share one or more data processing apparatuses, systems, computing devices, or processors A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and The processes and logic flows described in this specification can be performed by one or more programmable processors executing one or more computer programs (e.g., components of the data processing system) to perform actions by operating on input data and generating output. The processes and logic flows can also be performed by, and apparatuses can also be implemented as, special purpose logic circuitry, e.g., an FPGA (field-programmable gate array) or an ASIC (application-specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter and the operations described in this specification can be implemented in digital electronic circuitry or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial-access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims.

What is claimed is:

1. A vehicle control device comprising:

a receiver configured to receive rear wheel steering angle information, partial braking pressure information, and driving speed information of a vehicle;

a coefficient extractor configured to extract a coefficient of a front wheel steering angle variable, by using at least one of the rear wheel steering angle information, the partial braking pressure information, and the driving speed information;

a front wheel steering angle estimator configured to estimate a front wheel steering angle of the vehicle, by inputting the coefficient of the front wheel steering angle variable, the rear wheel steering angle information, and the partial braking pressure information into a steering angle estimation function; and a control signal generator configured to generate a control signal for controlling an operation of the vehicle, by using an estimated front wheel steering angle.

2. The vehicle control device of claim 1, further comprising:

a failure determiner configured to determine whether a Steer-by-Wire (SbW) system of the vehicle is in a failure state, wherein the control signal generator is further configured to generate the control signal for controlling the operation of the vehicle, by using the estimated front wheel steering angle, in response to a determination of the failure state of the SbW system of the vehicle.

3. The vehicle control device of claim 2, wherein the failure determiner is further configured to determine the failure state of the SbW system of the vehicle, based on at least one output signal of the SbW system of the vehicle.

4. The vehicle control device of claim 1, wherein the coefficient of a front wheel steering angle variable is stored in a table by being correspondent to at least one of a rear wheel steering and partial braking input ratio, and the driving speed information of the vehicle.

5. The vehicle control device of claim 4, wherein the front wheel steering angle estimator is further configured to retrieve the coefficient of the front wheel steering angle variable stored correspondingly to at least one of the driving speed information of the vehicle and the rear wheel steering and partial braking input ratio of the vehicle from the table, and estimate the front wheel steering angle of the vehicle, by inputting the coefficient of the front wheel steering angle variable, the rear wheel steering angle information and the partial braking pressure information detected from the vehicle into the steering angle estimation function.

6. The vehicle control device of claim 1, wherein the coefficient of the front wheel steering angle variable is calculated based on a least square linear regression method, which minimizes a square of a difference between a first matrix including a plurality of front wheel steering angle information and the coefficient of the front wheel steering angle variable and a second matrix including a plurality of rear wheel steering angle information and a plurality of partial braking pressure variable information.

7. The vehicle control device of claim 1, wherein the coefficient of the front wheel steering angle variable is learned through an artificial intelligence model, which uses a plurality of front wheel steering angle information, a plurality of rear wheel steering angle information, and a plurality of partial braking pressure variable information as input data, wherein the coefficient of the front wheel steering angle variable is determined based on data output by inputting the driving speed of the vehicle to the artificial intelligence model.

8. The vehicle control device of claim 1, wherein the steering angle estimation function comprises a first equation including a product of the front wheel steering angle variable and the coefficient of the front wheel steering angle variable, and a second equation including a sum of a partial braking pressure variable and a rear wheel steering angle variable.

9. The vehicle control device of claim 8, wherein the partial braking pressure variable and the rear wheel steering angle variable included in the steering angle estimation function are adjusted in ratio by K, which is a real number between 0 and 1, or 0, or 1 and is a preset rear wheel steering and partial braking input ratio value of the vehicle.

10. A vehicle control method comprising:

receiving rear wheel steering angle information, partial braking pressure information, and driving speed information of a vehicle;

extracting a coefficient of a front wheel steering angle variable, by using at least one of the rear wheel steering angle information, the partial braking pressure information, and the driving speed information;

estimating a front wheel steering angle of the vehicle, by inputting the coefficient of the front wheel steering angle variable, the rear wheel steering angle information, and the partial braking pressure information into a steering angle estimation function; and generating a control signal for controlling an operation of the vehicle, by using an estimated front wheel steering angle.

11. The vehicle control method of claim 10, further comprising:

determining whether a Steer-by-Wire (SbW) system of the vehicle is in a failure state, wherein the generating comprises:

generating the control signal for controlling the operation of the vehicle, by using the estimated front wheel steering angle, in response to a determination of the failure state of the SbW system of the vehicle.

12. The vehicle control method of claim 11, wherein the determining comprises:

determining the failure state of the SbW system, based on at least one output signal of the SbW system of the vehicle.

13. The vehicle control method of claim 10, wherein the coefficient of a front wheel steering angle variable is stored in a table by being correspondent to at least one of a rear wheel steering and partial braking input ratio, and the driving speed information of the vehicle.

14. The vehicle control method of claim 13, wherein the estimating comprises retrieving the coefficient of the front wheel steering angle variable stored correspondingly to at least one of the driving speed information of the vehicle and the rear wheel steering and partial braking input ratio of the vehicle from the table, and estimating the front wheel steering angle of the vehicle by inputting the coefficient of the front wheel steering angle variable, the rear wheel steering angle information and the partial braking pressure information detected from the vehicle into the steering angle estimation function.

15. The vehicle control method of claim 10, wherein the coefficient of the front wheel steering angle variable calculated based on a least square linear regression method, which minimizes a square of a difference between a first matrix including a plurality of front wheel steering angle information and the coefficient of the front wheel steering angle variable and a second matrix including a plurality of rear wheel steering angle information and a plurality of partial braking pressure variable information.

16. The vehicle control method of claim 10, wherein the coefficient of the front wheel steering angle variable is learned through an artificial intelligence model which uses a plurality of front wheel steering angle information, a plurality of rear wheel steering angle information, and a plurality of partial braking pressure variable information as input data, wherein the coefficient of the front wheel steering angle variable is determined based on data output by inputting the driving speed of the vehicle to the artificial intelligence model.

17. The vehicle control method of claim 10, wherein the steering angle estimation function comprises a first equation including a product of the front wheel steering angle variable and the coefficient of the front wheel steering angle variable, and a second equation including a sum of a partial braking pressure variable and a rear wheel steering angle variable.

18. The vehicle control method of claim 17, wherein the partial braking pressure variable and the rear wheel steering angle variable included in the steering angle estimation function are adjusted in ratio by K, which is a real number between 0 and 1, or 0, or 1) and is a preset rear wheel steering and partial braking input ratio value of the vehicle.

19. A vehicle control device comprising:

at least one memory configured to store computer program instructions; and at least one processor configured to execute the computer program instructions stored in the at least one memory, wherein the at least one processor is further configured to:

receive rear wheel steering angle information, partial braking pressure information, and driving speed information of a vehicle;

extract a coefficient of a front wheel steering angle variable, by using at least one of the rear wheel steering angle information, the partial braking pressure information, and the driving speed information;

estimate a front wheel steering angle of the vehicle, by inputting the coefficient of the front wheel steering angle variable, the rear wheel steering angle information, and the partial braking pressure information into a steering angle estimation function; and generate a control signal for controlling an operation of the vehicle, by using an estimated front wheel steering angle.

20. The vehicle control device of claim 19, wherein the at least one processor is further configured to determine whether a Steer-by-Wire (SbW) system of the vehicle is in a failure state, wherein the at least one processor is further configured to generate the control signal for controlling the operation of the vehicle, by using the estimated front wheel steering angle, in response to a determination of the failure state of the SbW system of the vehicle.

* * * * *